(12) United States Patent
Xu

(10) Patent No.: US 10,311,815 B2
(45) Date of Patent: Jun. 4, 2019

(54) LIQUID CRYSTAL DISPLAY PANEL AND INVERSION CONTROL METHOD AND DEVICE FOR THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Zhetao Xu, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/844,941

(22) Filed: Dec. 18, 2017

(65) Prior Publication Data

US 2018/0254013 A1 Sep. 6, 2018

(30) Foreign Application Priority Data

Mar. 3, 2017 (CN) .......................... 2017 1 0124140

(51) Int. Cl.
*G09G 3/34* (2006.01)
*G09G 3/36* (2006.01)
*G02F 1/1343* (2006.01)

(52) U.S. Cl.
CPC ......... *G09G 3/3648* (2013.01); *G02F 1/1343* (2013.01); *G09G 3/3614* (2013.01); *G09G 2320/0209* (2013.01)

(58) Field of Classification Search
CPC .............. G09G 3/3648; G09G 3/3614; G09G 2320/0209; G02F 1/1343
See application file for complete search history.

(56) References Cited

U.S. PATENT DOCUMENTS

2002/0084970 A1 7/2002 Ozawa
2003/0058204 A1* 3/2003 Moon .................. G09G 3/3655
345/87

(Continued)

FOREIGN PATENT DOCUMENTS

CN 1504986 A 6/2004
CN 101676987 A 3/2010
(Continued)

OTHER PUBLICATIONS

First Office Action for Chinese Application No. 201710124140.3, dated Dec. 27, 2018, 8 Pages.

*Primary Examiner* — Sejoon Ahn
(74) *Attorney, Agent, or Firm* — Brooks Kushman P.C.

(57) ABSTRACT

The present disclosure provides a liquid crystal display panel, and an inversion control method and device for the same. The method includes: applying a first inversion signal corresponding to a current image frame to a plurality of pixel blocks of the liquid crystal display panel; determining a target pixel block from the plurality of pixel blocks, wherein a charge accumulation value of a target pixel row where the target pixel block is located is greater than or equal to a first preset threshold, and a charge accumulation value of the target pixel block is greater than or equal to a second preset threshold; and applying a second inversion signal reverse to the first inversion signal to the target pixel block.

11 Claims, 3 Drawing Sheets

(56) References Cited

U.S. PATENT DOCUMENTS

| | | | |
|---|---|---|---|
| 2003/0058207 A1* | 3/2003 | Washio | G09G 3/3648 345/87 |
| 2004/0108988 A1 | 6/2004 | Choi | |
| 2008/0036753 A1 | 2/2008 | Washio et al. | |
| 2010/0073341 A1 | 3/2010 | Toyooka et al. | |
| 2015/0206498 A1* | 7/2015 | Miyata | G09G 3/3614 345/208 |
| 2015/0243233 A1* | 8/2015 | Bloks | G09G 3/3614 345/96 |
| 2015/0287374 A1* | 10/2015 | Chen | G09G 3/3688 345/98 |
| 2015/0287375 A1* | 10/2015 | Tanaka | G09G 3/3648 345/209 |
| 2015/0302807 A1* | 10/2015 | Dai | G09G 3/3614 345/694 |
| 2016/0351138 A1 | 12/2016 | Wang et al. | |

FOREIGN PATENT DOCUMENTS

| | | |
|---|---|---|
| CN | 106205516 A | 12/2016 |
| JP | 2002202762 A | 7/2002 |

* cited by examiner

LIQUID CRYSTAL DISPLAY PANEL AND INVERSION CONTROL METHOD AND DEVICE FOR THE SAME

CROSS-REFERENCE TO RELATED APPLICATION

This application claims priority to Chinese Patent Application No. 201710124140.3 filed Mar. 3, 2017, which is incorporated herein by reference in its entirety.

TECHNICAL FIELD

The present disclosure relates to a field of liquid crystal display technologies, and in particular to a liquid crystal display panel and an inversion control method and device for the same.

BACKGROUND

Due to its characteristics of low radiation, thin thickness, or the like, a liquid crystal display panel is widely applied in an electronic display device such as a mobile phone, a television, a laptop, or the like. A picture quality provided by the liquid crystal display panel is of great importance for a user to use an electronic device.

In order to uniform a picture displayed by the liquid crystal display panel, in a related art, some pictures are preset by a time controller (T-con). In the case that the time controller detects a preset picture, the picture quality is improved by changing an inversion mode of a pixel. The inversion mode of the pixel may include, for example, dot inversion, row inversion, column inversion, frame inversion, or the like. During a process of loading a picture, the picture is loaded onto the liquid crystal display panel line by line in scanning sequence. As for a certain pixel row in the liquid crystal display panel, in the case that a current image frame is loaded, polarities of the pixels of this pixel row are inverted by an inversion signal corresponding to the current image frame. It is assumed that FIG. 1 is a schematic diagram of a driving voltage of a subpixel source electrode of the pixel row obtained after inversion. As shown in FIG. 1, L0 and L255 represent a gray level, L0 shows a high gray level of a pixel point, L255 shows a low gray level of a pixel point, L0 '+' represents a positive charge of the L0 gray level, L255 '+' represents a positive charge of the L255 gray level, L0 '−' represents a negative charge of the L0 gray level, and L255 '−' represents a negative charge of the L255 gray level. By an analysis of FIG. 1, it is determined that positive and negative charges of this pixel row are asymmetrical, i.e., the positive and negative charges loaded by a TFT (Thin Film Transistor) source electrode in the liquid crystal display panel are asymmetrical. However, in the case of asymmetrical positive and negative charges loaded by the TFT source electrode, a potential jump on the TFT source electrode would be coupled to a common electrode via a parasitic capacitance. A voltage change in the common electrode causes a picture crosstalk.

SUMMARY

An objective of the present disclosure is to provide a liquid crystal display panel, and an inversion control method and device for the same.

According to a first aspect of the present disclosure, there is provided an inversion control method for a liquid crystal display panel, including: applying a first inversion signal corresponding to a current image frame to a plurality of pixel blocks of the liquid crystal display panel; determining a target pixel block from the plurality of pixel blocks, wherein a charge accumulation value of a target pixel row where the target pixel block is located is greater than or equal to a first preset threshold, and a charge accumulation value of the target pixel block is greater than or equal to a second preset threshold; applying a second inversion signal reverse to the first inversion signal to the target pixel block.

Optionally, the determining a target pixel block from the plurality of pixel blocks includes: detecting a charge accumulation value of each pixel row in a plurality of pixel rows of the liquid crystal display panel, wherein each pixel row comprises N pixel blocks, and the N is a positive integer; determining a pixel row with a charge accumulation value greater than or equal to the first preset threshold as the target pixel row; and determining, from N pixel blocks of the target pixel row, a pixel block with a charge accumulation value greater than or equal to the second preset threshold as the target pixel block.

Optionally, each pixel block includes a same number of subpixels.

Optionally, the detecting a charge accumulation value of each pixel row in a plurality of pixel rows of the liquid crystal display panel includes: obtaining a number of positively changing subpixels and a number of negatively changing subpixels in each of the pixel rows; calculating a first difference value between the number of positively changing subpixels and the number of negatively changing subpixels in each of the pixel rows; determining that the charge accumulation value of the pixel row is greater than or equal to the first preset threshold in the case that the first difference value is greater than a third preset threshold; wherein the number of positively changing subpixels includes a number of subpixels whose source voltage polarities are changed from negative into positive, and the number of negatively changing subpixels includes a number of subpixels whose source voltage polarities are changed from positive into negative.

Optionally, the determining, from N pixel blocks of the target pixel row, a pixel block with a charge accumulation value greater than or equal to the second preset threshold as the target pixel block includes: obtaining a number of positively changing subpixels and a number of negatively changing subpixels in each of the pixel blocks of the target pixel row; calculating a second difference value between the number of positively changing subpixels and the number of negatively changing subpixels in each of the pixel blocks of the target pixel row; and determining that the charge accumulation value in the pixel block is greater than or equal to the second preset threshold in the case that the second difference value is greater than a fourth preset threshold.

Optionally, the charge accumulation value of each pixel row is detected by a time controller in a liquid crystal display panel.

Optionally, the method further includes: applying a third inversion signal to each of the plurality of pixel blocks, wherein the third inversion signal is generated according to a next image frame corresponding to the plurality of pixel blocks.

Optionally, the first preset threshold is preset according to a resolution and a parasitic capacitance of the liquid crystal display panel; and/or the second preset threshold is preset according to a resolution, a parasitic capacitance and a number of pixel blocks of the liquid crystal display panel.

Optionally, the first preset threshold is greater than the second preset threshold.

According to a second aspect of the present disclosure, there is provided an inversion control device for a liquid crystal display panel, including: a processor and a memory, the processor, by executing instructions stored in the memory, configured to: apply a first inversion signal corresponding to a current image frame to a plurality of pixel blocks of the liquid crystal display panel, determine a target pixel block from the plurality of pixel blocks, and apply a second inversion signal reverse to the first inversion signal to the target pixel block; wherein a charge accumulation value of a target pixel row where the target pixel block is located is greater than or equal to a first preset threshold, and a charge accumulation value of the target pixel block is greater than or equal to a second preset threshold.

Optionally, the processor is further configured to detect a charge accumulation value of each pixel row in a plurality of pixel rows of the liquid crystal display panel, wherein each pixel row comprises N pixel blocks, and the N is a positive integer; determine a pixel row with a charge accumulation value greater than or equal to the first preset threshold as the target pixel row; and determine, from N pixel blocks of the target pixel row, a pixel block with a charge accumulation value greater than or equal to the second preset threshold as the target pixel block Optionally, each pixel block includes a same number of subpixels.

Optionally, the processor is configured to obtain a number of positively changing subpixels and a number of negatively changing subpixels in each of the pixel rows, calculate a first difference value between the number of positively changing subpixels and the number of negatively changing subpixels in each of the pixel rows, and determine that the charge accumulation value of the pixel row is greater than or equal to the first preset threshold in the case that the first difference value is greater than a third preset threshold wherein the number of positively changing subpixels includes a number of subpixels whose source voltage polarities are changed from negative into positive, and the number of negatively changing subpixels includes a number of subpixels whose source voltage polarities are changed from positive into negative.

Optionally, the processor is further configured to obtain a number of positively changing subpixels and a number of negatively changing subpixels in each of the pixel blocks of the target pixel row, calculate a second difference value between the number of positively changing subpixels and the number of negatively changing subpixels in each of the pixel blocks of the target pixel row, and determine that the charge accumulation value in the pixel block is greater than or equal to the second preset threshold in the case that the second difference value is greater than a fourth preset threshold.

Optionally, the processor is further configured to apply a third inversion signal to each of the plurality of pixel blocks, wherein the third inversion signal is generated according to a next image frame corresponding to the plurality of pixel blocks.

Optionally, the charge accumulation value of each pixel row is detected by a time controller of the liquid crystal display panel.

Optionally, the first preset threshold is preset according to a resolution and a parasitic capacitance of the liquid crystal display panel; and/or the second preset threshold is preset according to a resolution, a parasitic capacitance and a number of pixel blocks of the liquid crystal display panel.

Optionally, the first preset threshold is greater than the second preset threshold.

According to a third aspect of the present disclosure, there is provided a liquid crystal display panel, including any one of the above-mentioned inversion control devices of the liquid crystal display panel.

BRIEF DESCRIPTION OF THE DRAWINGS

The above-mentioned and/or additional aspects and advantages of the present disclosure will become apparent and easily understood from the following description of the embodiments in conjunction with the accompanying drawings, in which.

DETAILED DESCRIPTION

Figure 1:
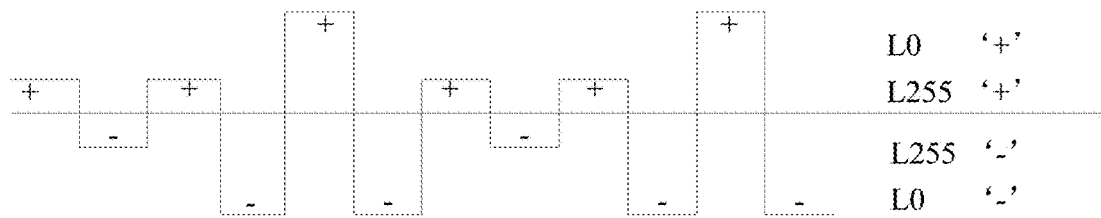
FIG. 1 is a schematic diagram of a driving voltage of a subpixel source electrode of a pixel row obtained after inversion.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present disclosure, which shall not be construed as causing limitations to the present disclosure.

A liquid crystal display panel and an inversion control method and device for the same according to some embodiments of the present disclosure will be described below with reference to the drawings.

Figure 2:
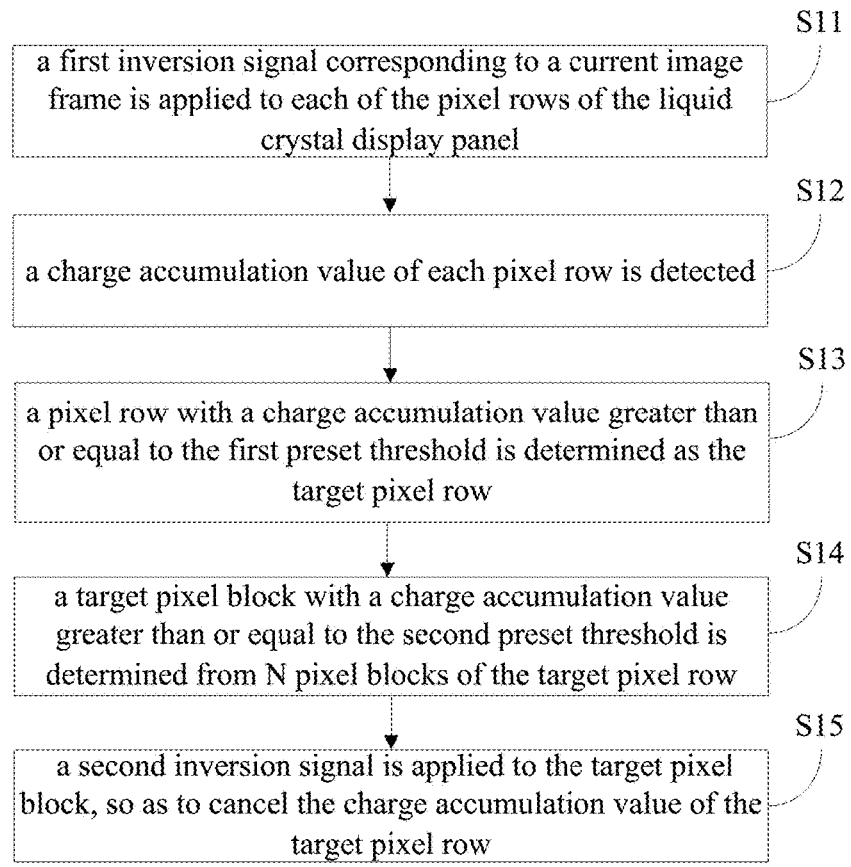
FIG. 2 is a flow chart of an inversion control method for a liquid crystal display panel according to some embodiment of the present disclosure.

FIG. 2 is a flow chart of an inversion control method for a liquid crystal display panel according to some embodiment of the present disclosure.

As shown in FIG. 2, the inversion control method for a liquid crystal display panel according to an embodiment of the present disclosure includes the following steps.

In S11, a first inversion signal corresponding to a current image frame is applied to each of the pixel rows of the liquid crystal display panel.

The first inversion signal is configured to adjust the polarity of a pixel in each pixel row.

As an example, the first inversion signal is generated by a timing controller according to the current image frame in advance.

In S12, a charge accumulation value of each pixel row is detected.

Each pixel row includes N pixel blocks, wherein N is a positive integer.

Preferably, each of the pixel blocks includes the same number of subpixels.

For example, each pixel block includes M subpixels, wherein M is a positive integer.

Figure 3:
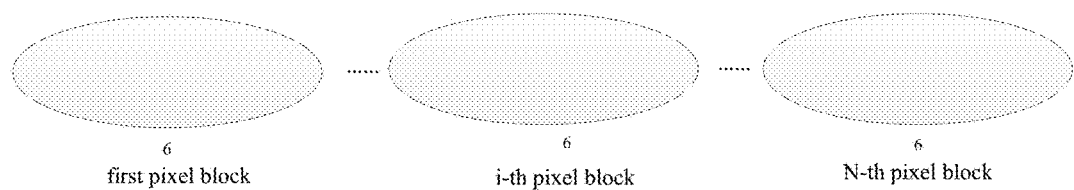
FIG. 3 is an exemplary diagram of a pixel block of a pixel row.

For example, it is assumed that each pixel block includes 6 subpixels. FIG. 3 shows the pixel block of the pixel row.

It should be understood that in the liquid crystal display panel, each pixel point includes R, G and B subpixels, each of which is controlled by one TFT switch.

In an embodiment of the present disclosure, after the first inversion signal corresponding to the current image frame is applied to each pixel row, a number of positively changing subpixels and a number of negatively changing subpixels in each of the pixel rows may be obtained, a first difference value between the number of positively changing subpixels and the number of negatively changing subpixels in each of the pixel rows is calculated, and the charge accumulation value of this pixel row is determined according to the first difference value between the number of positively changing subpixels and the number of negatively changing subpixels.

The number of positively changing subpixels represents a number of subpixels whose source voltage polarities are changed from negative into positive.

For example, it is assumed that the pixel row includes subpixels of L0'−', L255'+', L255'−' and L0'+'. After the first inversion signal corresponding to the current image frame is applied to the pixel row, the number of subpixels, in the pixel row, whose source voltage polarities are changed from L0'−' into L255'+', from L0'−' into L0'+', from L255'−' into L255'+' and from L255'−' into L0'+' may be calculated out.

For example, it is assumed that the pixel row includes subpixels of L0'−', L255'+', L255'−' and L0'+'. After the first inversion signal corresponding to the current image frame is applied to the pixel row, the number of subpixels, in the pixel row, whose source voltage polarities are changed from L0'+' into L255'−', from L0'+' into L0'−', from L255'+' into L255'−' and from L255'+' into L0'−' may be calculated out.

Preferably, the charge accumulation value of the pixel row after the application of the first inversion signal is detected by a time controller in a liquid crystal display panel.

As an exemplary embodiment, the process of detecting the charge accumulation value of the pixel row after the application of the first inversion signal by the time controller is as follows. Row data of the pixel row is stored in a row buffer in the time controller, a calculating unit in the time controller calculates a first difference value between the number of positively changing subpixels and the number of negatively changing subpixels in each of the pixel rows, and the charge accumulation value of the target pixel row is determined according to the first difference value between the number of positively changing subpixels and the number of negatively changing subpixels.

In S13, a pixel row with a charge accumulation value greater than or equal to the first preset threshold is determined as the target pixel row.

The first preset threshold is the one of the charge accumulation value set in advance for the pixel row according to the resolution and the parasitic capacitance of the liquid crystal display panel.

It should be noted that the liquid crystal display panels with different resolutions correspond to different first preset thresholds.

In an embodiment of the present disclosure, after the first difference value between the number of positively changing subpixels and the number of negatively changing subpixels in each pixel row is calculated, it may be determined whether the first difference value is greater than a third preset threshold. It is determined that the charge accumulation value of the pixel row is greater than or equal to the first preset threshold if the difference value is greater than the third preset threshold.

The third preset threshold is the one of the difference value between the number of positively changing subpixels and the number of negatively changing subpixels preset for the pixel row according to a resolution, a parasitic capacitance and the number of pixel blocks of the liquid crystal display panel.

In S14, a target pixel block with a charge accumulation value greater than or equal to the second preset threshold is determined from N pixel blocks of the target pixel row.

The second preset threshold is the one of the charge accumulation value set for the pixel block in advance according to the resolution parameter, the parasitic capacitance and the number of pixel blocks of the liquid crystal display panel.

It should be understood that the first preset threshold is greater than the second preset threshold. Specifically, after the target pixel row is determined according to the charge accumulation value of the pixel row, for the target pixel row, a number of positively changing subpixels and a number of negatively changing subpixels in each of the pixel rows may be obtained, and a first difference value between the number of positively changing subpixels and the number of negatively changing subpixels in each of the pixel rows is calculated. It is determined that the charge accumulation value of this pixel block is greater than or equal to the second preset threshold in the case that the second difference value is greater than a fourth preset threshold, i.e., this pixel block is the target pixel block.

It should be understood that there may be one or more target pixel blocks.

As an exemplary embodiment, after the target pixel row is determined, according to the row data signal in the row buffer of the time controller in the liquid crystal display panel, the number of positively changing subpixels and the number of negatively changing subpixels in each pixel block may be calculated, and a second difference value between the number of positively changing subpixels and the number of negatively changing subpixels in each pixel block is calculated. It is determined that the charge accumulation value in the pixel block is greater than or equal to the second preset threshold in the case that the second difference value is greater than the fourth preset threshold.

The fourth preset threshold is the one of the difference value between the number of positively changing subpixels and the number of negatively changing subpixels preset for the pixel block according to the resolution, parasitic capacitance and the number of pixel blocks of the liquid crystal display panel.

In S15, a second inversion signal is applied to the target pixel block, so as to cancel the charge accumulation value of the target pixel row.

The second inversion signal is a reverse signal of the first inversion signal corresponding to the target pixel block.

Figure 4:
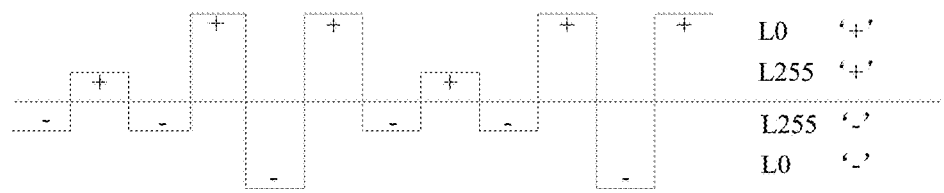
FIG. 4 is a schematic diagram of a driving voltage of a subpixel source electrode of a pixel row obtained after the second inversion signal is applied on the pixel row according to some embodiment of the present disclosure.

For example, after the first inversion signal corresponding to the current image frame is applied to a certain pixel row, it is assumed that FIG. 1 is a schematic diagram of a driving voltage of the subpixel source electrode of the pixel row obtained after inversion. As shown in FIG. 1, the positive and negative charges are asymmetrical. In order to neutralize the positive and negative charge numbers of the pixels in this row, and alleviate the picture crosstalk, the second inversion signal may be applied to the pixel row, so as to cancel the charge accumulation value of this pixel row. FIG. 4 is a schematic diagram of a driving voltage of the subpixel source electrode obtained after the second inversion signal is directly applied to the pixel row. As shown in FIG. 4, the charge accumulation caused by the application of the first inversion signal to the pixel row may be canceled by applying the second inversion signal.

In the inversion control method for the liquid crystal display panel according to the embodiment of the present disclosure, the first inversion signal corresponding to the current image frame is applied to each pixel row of the liquid crystal display panel, the charge accumulation value of each pixel row is detected, the pixel row with a charge accumulation value greater than or equal to the first preset threshold is determined as the target pixel row, the target pixel block with a charge accumulation value greater than or equal to the second preset threshold is determined from N pixel blocks of the target pixel row, and the second inversion signal is applied to the target pixel block. Thus, the charge accumulation value of the target pixel row is canceled by applying the second inversion signal to the target pixel block, thereby reducing a potential jump of the common electrode caused by the parasitic capacitance coupling, avoiding the picture crosstalk in the liquid crystal display panel, and improving the picture quality of the liquid crystal display panel.

Based on the above-mentioned embodiment, in order to process a next image frame for the pixel row, after the second inversion signal is applied to the target pixel block, a third inversion signal is applied to each pixel row.

The third inversion signal is generated according to the next image frame corresponding to each pixel row.

Based on the above-mentioned embodiment, in an embodiment of the present disclosure, after the charge accumulation value of the pixel row is detected, in the case that the charge accumulation value of each pixel row is less than the first preset threshold, the third inversion signal is applied to each pixel row.

That is to say, when it is determined that no potential jump on the TFT source electrode is caused after the first inversion signal is applied to each pixel row, the pixel row is controllable to process the next image frame.

In order to implement the above-mentioned embodiments, the present disclosure further provides an inversion control device for a liquid crystal display panel.

Figure 5:
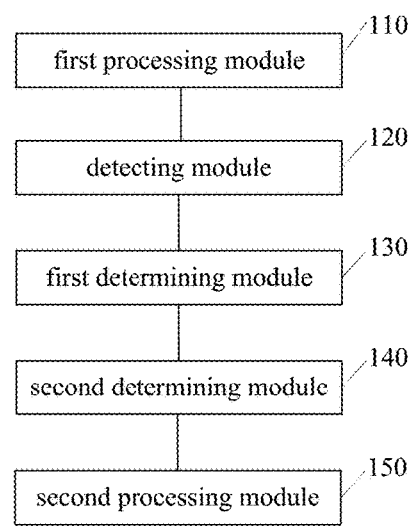
FIG. 5 is a structural schematic diagram of an inversion control device for a liquid crystal display panel according to some embodiments of the present disclosure.

FIG. 5 is a structural schematic diagram of an inversion control device for a liquid crystal display panel according to some embodiment of the present disclosure.

As shown in FIG. 5, the inversion control device for the liquid crystal display panel according to the embodiment of the present disclosure includes a first processing module 110, a detecting module 120, a first determining module 130, a second determining module 140 and a second processing module 150.

The first processing module 110 is configured to apply a first inversion signal corresponding to a current image frame to each pixel row of the liquid crystal display panel;

The detecting module 120 is configured to detect the charge accumulation value of each pixel row.

Each pixel row includes N pixel blocks.

Preferably, each of the pixel blocks includes the same number of subpixels.

For example, each pixel block includes M subpixels, wherein M is a positive integer.

The first determining module 130 is configured to determine a pixel row with a charge accumulation value greater than or equal to the first preset threshold as the target pixel row.

The second determining module 140 is configured to determine, from N pixel blocks of the target pixel row, the target pixel block with a charge accumulation value greater than or equal to the second preset threshold.

The first preset threshold is the one of the charge accumulation value set in advance for the pixel row according to the resolution and the parasitic capacitance of the liquid crystal display panel.

It should be noted that the liquid crystal display panels with different resolutions correspond to different first preset thresholds.

The second preset threshold is the one of the charge accumulation value set for the pixel block in advance according to the resolution parameter, the parasitic capacitance and the number of pixel blocks of the liquid crystal display panel.

It should be understood that the first preset threshold is greater than the second preset threshold.

The second processing module 150 is configured to apply the second inversion signal to the target pixel block, so as to cancel the charge accumulation value of the target pixel row.

The second inversion signal is a reverse signal of the first inversion signal corresponding to the target pixel block.

In an embodiment of the present disclosure, the detecting module 120 is further configured to obtain a number of positively changing subpixels and a number of negatively changing subpixels in each of the pixel rows, calculate a first difference value between the number of positively changing subpixels and the number of negatively changing subpixels in each of the pixel rows, and determine that the charge accumulation value of this pixel row is greater than or equal to the first preset threshold in the case that the first difference value is greater than the third preset threshold.

The number of positively changing subpixels is the number of subpixels whose source voltage polarities are changed from negative into positive.

For example, it is assumed that the pixel row includes subpixels of L0'−', L255'+', L255'−' and L0'+'. After the first inversion signal corresponding to the current image frame is applied to the pixel row, the number of subpixels, in the pixel row, whose source voltage polarities are changed from L0'−' into L255'+', from L0'−' into L0'+', from L255'−' into L255'+' and from L255'−' into L0'+' may be calculated out.

The number of negatively changing subpixels is the number of subpixels whose source voltage polarities are changed from positive into negative.

For example, it is assumed that the pixel row includes subpixels of L0'−', L255'+', L255'−' and L0'+'. After the first inversion signal corresponding to the current image frame is applied to the pixel row, the number of subpixels, in the pixel row, whose source voltage polarities are changed from L0'+' into L255'−', from L0'+' into L0'−', from L255'+' into L255'−' and from L255'+' into L0'−' may be calculated out.

The third preset threshold is the one of the difference value between the number of positively changing subpixels and the number of negatively changing subpixels preset for the pixel row according to the resolution, parasitic capacitance and the number of pixel blocks of the liquid crystal display panel.

In an embodiment of the present disclosure, the detecting module 120 may detect the charge accumulation value of each pixel row by the time controller in the liquid crystal display panel.

Specifically, the detecting module 120 may be further configured to obtain the number of positively changing subpixels and the number of negatively changing subpixels in the pixel row after the application of the first inversion signal by adopting the time controller in the liquid crystal display panel, calculate a difference value between the number of positively changing subpixels and the number of negatively changing subpixels, and determine the charge accumulation value of the pixel row according to the difference value between the number of positively changing subpixels and the number of negatively changing subpixels.

In an embodiment of the present disclosure, the second determining module 140 is further configured to obtain the number of positively changing subpixels and the number of negatively changing subpixels in each of the pixel blocks, calculate a second difference value between the number of positively changing subpixels and the number of negatively changing subpixels in each of the pixel blocks, and determine that the charge accumulation value of the pixel block is greater than or equal to the second preset threshold in the case that the second difference value is greater than the fourth preset threshold.

The fourth preset threshold is the one of the difference value between the number of positively changing subpixels and the number of negatively changing subpixels preset for the pixel block according to the resolution, parasitic capacitance and the number of pixel blocks of the liquid crystal display panel.

Figure 6:
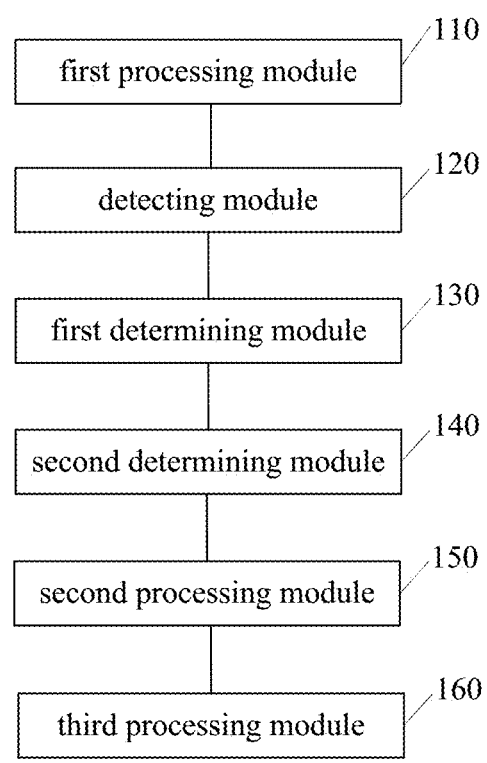
FIG. 6 is a structural schematic diagram of an inversion control device of a liquid crystal display panel according to some embodiments of the present disclosure.

In an embodiment of the present disclosure, in order to process the next image frame, on the basis of FIG. 5, as shown in FIG. 6, the device may further include a third processing module 160. The third processing module 160 is configured to apply a third inversion signal to each pixel row, wherein the third inversion signal is generated according to the next frame image corresponding to each pixel row.

Specifically, after the second inversion signal is applied to the target pixel block by the second processing module 150 so as to cancel the charge accumulation value of the target pixel row, the third processing module 160 is configured to apply the corresponding third inversion signal to each pixel row, such that each pixel row processes the next image frame.

It should be noted that the foregoing explanation to the inversion control method for the liquid crystal display panel is also suitable for the inversion control device for the liquid crystal display panel according to some embodiments, and is not repeated herein.

In the device for the liquid crystal display panel according to the embodiment of the present disclosure, the first inversion signal corresponding to the current image frame is applied to each pixel row of the liquid crystal display panel, the charge accumulation value of each pixel row is detected, the pixel row with a charge accumulation value greater than or equal to the first preset threshold is determined as the target pixel row, the target pixel block with a charge accumulation value greater than or equal to the second preset threshold is determined from N pixel blocks of the target pixel row, and the second inversion signal is applied to the target pixel block. Thus, the charge accumulation value of the target pixel row is canceled by applying the second inversion signal to the target pixel block, thereby reducing a potential jump of the common electrode caused by the parasitic capacitance coupling, avoiding the picture crosstalk in the liquid crystal display panel, and improving the picture quality of the liquid crystal display panel.

In order to implement the above-mentioned embodiment, the present disclosure further provides a liquid crystal display panel, including any one of the above-mentioned inversion control devices for the liquid crystal display panels.

The structure of the inversion control device for the liquid crystal display panel and the inversion control method as well as the principle are the same as those in the above-mentioned embodiments, and are not repeated herein.

In the liquid crystal display panel according to the embodiment of the present disclosure, the first inversion signal corresponding to the current image frame is applied to each pixel row of the liquid crystal display panel, the charge accumulation value of each pixel row is detected, the pixel row with a charge accumulation value greater than or equal to the first preset threshold is determined as the target pixel row, the target pixel block with a charge accumulation value greater than or equal to the second preset threshold is determined from N pixel blocks of the target pixel row, and the second inversion signal is applied to the target pixel block. Thus, the charge accumulation value of the target pixel row is canceled by applying the second inversion signal to the target pixel block, thereby reducing a potential jump of the common electrode caused by the parasitic capacitance coupling, avoiding the picture crosstalk in the liquid crystal display panel, and improving the picture quality of the liquid crystal display panel.

In the description of the present specification, reference terms such as "an embodiment", "some embodiments", "examples", "specific examples", "some examples", or the like are intended to refer to that the specific features, structures, materials, or characteristics which are described in combination with the embodiments or examples are included in at least one embodiment or example of the present disclosure. In this specification, schematic expressions of the above terms do not necessarily indicate the same embodiments or examples. In addition, the described specific features, structures, materials, or characteristics may be combined in any one or multiple embodiments or examples in a suitable way. In addition, in case of no contradiction, a person skilled in the art may incorporate or combine different embodiments or examples and features of different embodiments or examples described in this specification.

In addition, terms of "first", "second" are only used for description, but shall not be understood as indication or implication of relative importance or implicit indication of the number of the specific technical features. Therefore, the features defined by the terms "first" and "second" may explicitly or implicitly include one or more of these features. In the description of the present disclosure, the term "more" or "a plurality of" signifies at least two, unless otherwise specified.

Any procedure or method described in the flow charts or described in any other way herein may be understood to include one or more modules, portions or parts for storing executable codes that realize particular logic functions or procedures. Moreover, advantageous embodiments of the present disclosure include other implementations in which the order of execution is different from that which is depicted or discussed, including executing functions in a substantially simultaneous manner or in an opposite order according to the related functions. This should be understood by those skilled in the art to which embodiments of the present disclosure belong.

a logic and/or step described in other manners herein or shown in the flow chart, for example, a particular sequence table of executable instructions for realizing a logical function, may be specifically achieved in any computer readable medium to be used by the instruction execution system, device or equipment (such as the system based on a computer, the system including a processor or other system capable of obtaining the instruction from the instruction execution system, device and equipment and executing the instruction), or to be used in combination with the instruction execution system, device or equipment. As to the specification, "the computer readable medium" may be any device adaptive for including, storing, communicating, propagating or transferring a program to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing the program thereon, this is because, for example, the paper or other appropriate medium may be optically scanned and then edited, decrypted or processed with other appropriate methods when necessary to obtain the program in an electric manner, and then the program may be stored in a computer memory.

It is understood that each part of the present disclosure may be realized by hardware, software, firmware or any combination thereof. In the above embodiments, a plurality of steps or methods may be realized by the software or firmware stored in the memory and executed by the appropriate instruction execution system. For example, if it is realized by the hardware, likewise in another embodiment, the steps or methods may be realized by one or any combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with the program. The program may be stored in a computer readable storage medium, and the program include one or any combination of the steps in the method embodiments of the present disclosure when running on a computer.

In addition, all function cells of each embodiment of the present disclosure may be integrated in a processing module, or these cells may be separate physically, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be a read-only memory, a magnetic disk or CD, etc. Although the above description illustrates the embodiments of the present disclosure, it can be understood that the embodiments are merely exemplary, and shall not be construed as limitations to the present disclosure. The person skilled in the art may derive variations, modifications, and replacements to the above embodiments within the scope of the present disclosure.

What is claimed is:

1. An inversion control method for a liquid crystal display panel, comprising: applying a first inversion signal corresponding to a current image frame to a plurality of pixel blocks of the liquid crystal display panel; determining a target pixel block from the plurality of pixel blocks, wherein a charge accumulation value of a target pixel row where the target pixel block is located is greater than or equal to a first preset threshold, and a charge accumulation value of the target pixel block is greater than or equal to a second preset threshold; and applying a second inversion signal reverse to the first inversion signal to the target pixel block, wherein the determining a target pixel block from the plurality of pixel blocks comprises: detecting a charge accumulation value of each pixel row in a plurality of pixel rows of the liquid crystal display panel, wherein each pixel row comprises N pixel blocks, and the N is a positive integer; determining a pixel row with a charge accumulation value greater than or equal to the first preset threshold as the target pixel row; and determining, from N pixel blocks of the target pixel row, a pixel block with a charge accumulation value greater than or equal to the second preset threshold as the target pixel block, wherein each pixel block comprises a same number of subpixels, wherein the detecting a charge accumulation value of each pixel row in a plurality of pixel rows of the liquid crystal display panel comprises: obtaining a number of positively changing subpixels and a number of negatively changing subpixels in each of the pixel rows; calculating a first difference value between the number of positively changing subpixels and the number of negatively changing subpixels in each of the pixel rows; and determining that the charge accumulation value of the pixel row is greater than or equal to the first preset threshold in the case that the first difference value is greater than a third preset threshold; wherein the number of positively changing subpixels comprises a number of subpixels whose source voltage polarities are changed from negative into positive, and the number of negatively changing subpixels comprises a number of subpixels whose source voltage polarities are changed from positive into negative, and wherein the determining, from N pixel blocks of the target pixel row, a pixel block with a charge accumulation value greater than or equal to the second preset threshold as the target pixel block comprises: obtaining a number of positively changing subpixels and a number of negatively changing subpixels in each of the pixel blocks of the target pixel row; calculating a second difference value between the number of positively changing subpixels and the number of negatively changing subpixels in each of the pixel blocks of the target pixel row; and determining that the charge accumulation value in the pixel block is greater than or equal to the second preset threshold in the case that the second difference value is greater than a fourth preset threshold.

2. The method according to claim 1, wherein the charge accumulation value of each pixel row is detected by a time controller in a liquid crystal display panel.

3. The method according to claim 1, further comprising: applying a third inversion signal to each of the plurality of pixel blocks, wherein the third inversion signal is generated according to a next image frame corresponding to the plurality of pixel blocks.

4. The method according to claim 1, wherein: the first preset threshold is preset according to a resolution and a parasitic capacitance of the liquid crystal display panel; and/or the second preset threshold is preset according to a resolution, a parasitic capacitance and a number of pixel blocks of the liquid crystal display panel.

5. The method according to claim 1, wherein the first preset threshold is greater than the second preset threshold.

6. An inversion control device for a liquid crystal display panel, comprising: a processor and a memory, the processor, by executing instructions stored in the memory, configured to: apply a first inversion signal corresponding to a current image frame to a plurality of pixel blocks of the liquid crystal display panel, determine a target pixel block from the plurality of pixel blocks, and apply a second inversion signal reverse to the first inversion signal to the target pixel block; wherein a charge accumulation value of a target pixel row where the target pixel block is located is greater than or equal to a first preset threshold, and a charge accumulation value of the target pixel block is greater than or equal to a second preset threshold, wherein the processor is further configured to: detect a charge accumulation value of each pixel row in a plurality of pixel rows of the liquid crystal display panel, wherein each pixel row comprises N pixel blocks, and the N is a positive integer; determine a pixel row with a charge accumulation value greater than or equal to the first preset threshold as the target pixel row; and determine, from N pixel blocks of the target pixel row, a pixel block with a charge accumulation value greater than or equal to the second preset threshold as the target pixel block, wherein each pixel block comprises a same number of subpixels, wherein the processor is further configured to: obtain a number of positively changing subpixels and a number of negatively changing subpixels in each of the pixel rows; calculate a first difference value between the number of positively changing subpixels and the number of negatively changing subpixels in each of the pixel rows; and determine that the charge accumulation value of the pixel row is greater than or equal to the first preset threshold in the case that the first difference value is greater than a third preset threshold; wherein the number of positively changing subpixels comprises a number of subpixels whose source voltage polarities are changed from negative into positive, and the number of negatively changing subpixels comprises a number of subpixels whose source voltage polarities are changed from positive into negative, wherein the processor is further configured to: obtain a number of positively changing subpixels and a number of negatively changing subpixels in each of the pixel blocks of the target pixel row; calculate a second difference value between the number of positively changing subpixels and the number of negatively changing subpixels in each of the pixel blocks of the target pixel row; and determine that the charge accumulation value in the pixel block is greater than or equal to the second preset threshold in the case that the second difference value is greater than a fourth preset threshold.

7. The device according to claim 6, wherein the charge accumulation value of each pixel row is detected by a time controller of the liquid crystal display panel.

8. The device according to claim 6, wherein the processor is further configured to apply a third inversion signal to each of the plurality of pixel blocks, wherein the third inversion signal is generated according to a next image frame corresponding to the plurality of pixel blocks.

9. The device according to claim 6, wherein: the first preset threshold is preset according to a resolution and a parasitic capacitance of the liquid crystal display panel; and/or the second preset threshold is preset according to a resolution, a parasitic capacitance and a number of pixel blocks of the liquid crystal display panel.

10. The device according to claim 6, wherein the first preset threshold is greater than the second preset threshold.

11. A liquid crystal display panel, comprising: an inversion control device comprising: a processor and a memory, the processor, by executing instructions stored in the memory, configured to: apply a first inversion signal corresponding to a current image frame to a plurality of pixel blocks of the liquid crystal display panel, determine a target pixel block from the plurality of pixel blocks, and apply a second inversion signal reverse to the first inversion signal to the target pixel block; wherein a charge accumulation value of a target pixel row where the target pixel block is located is greater than or equal to a first preset threshold, and a charge accumulation value of the target pixel block is greater than or equal to a second preset threshold, wherein the processor is further configured to: detect a charge accumulation value of each pixel row in a plurality of pixel rows of the liquid crystal display panel, wherein each pixel row comprises N pixel blocks, and the N is a positive integer; determine a pixel row with a charge accumulation value greater than or equal to the first preset threshold as the target pixel row; and determine, from N pixel blocks of the target pixel row, a pixel block with a charge accumulation value greater than or equal to the second preset threshold as the target pixel block, wherein each pixel block comprises a same number of subpixels, wherein the processor is further configured to: obtain a number of positively changing subpixels and a number of negatively changing subpixels in each of the pixel rows; calculate a first difference value between the number of positively changing subpixels and the number of negatively changing subpixels in each of the pixel rows; and determine that the charge accumulation value of the pixel row is greater than or equal to the first preset threshold in the case that the first difference value is greater than a third preset threshold; wherein the number of positively changing subpixels comprises a number of subpixels whose source voltage polarities are changed from negative into positive, and the number of negatively changing subpixels comprises a number of subpixels whose source voltage polarities are changed from positive into negative, wherein the processor is further configured to: obtain a number of positively changing subpixels and a number of negatively changing subpixels in each of the pixel blocks of the target pixel row; calculate a second difference value between the number of positively changing subpixels and the number of negatively changing subpixels in each of the pixel blocks of the target pixel row; and determine that the charge accumulation value in the pixel block is greater than or equal to the second preset threshold in the case that the second difference value is greater than a fourth preset threshold.

* * * * *